March 9, 1926.
E. A. POWELL
1,576,218
STOCK WATERING FOUNTAIN
Filed April 30, 1924
Fig. 1.
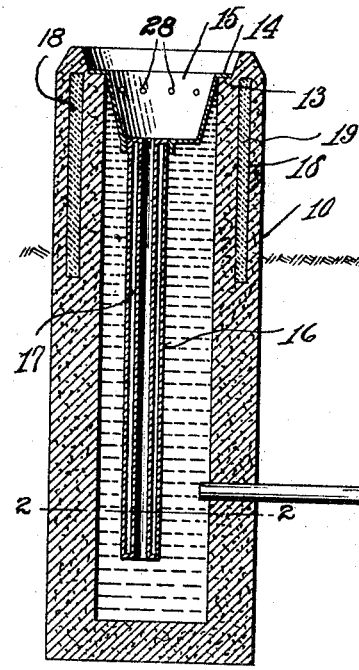
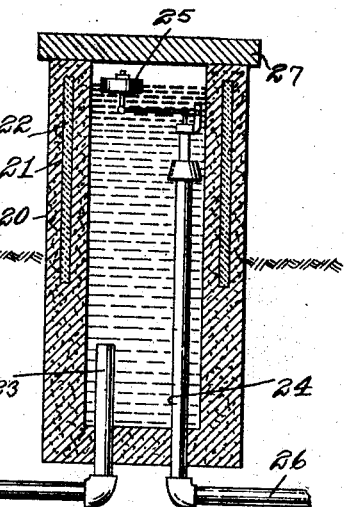
Fig. 2.
Inventor
Ernest A. Powell.
By
Attorney Patented Mar. 9, 1926.

1,576,213

UNITED STATES PATENT OFFICE.

ERNEST A. POWELL, OF RAWSON, OHIO.

STOCK-WATERING FOUNTAIN.

Application filed April 30, 1924. Serial No. 710,056.

*To all whom it may concern:*

Be it known that I, ERNEST A. POWELL, a citizen of the United States, residing at Rawson, in the county of Hancock, State of Ohio, have invented certain new and useful Improvements in Stock-Watering Fountains; and I do hereby declare the following to be a full, clear, and exact description of the invention, such as will enable others skilled in the art to which it appertains to make and use the same.

This invention relates to new and useful improvements in stock watering fountains.

One object of the invention is to provide a device of this character wherein the water is prevented from freezing without the use of artificial heat.

Another object is to provide a device of this character wherein a circulation is induced, whereby to prevent the cooler water remaining exposed to the cold air for too great a period, thus preventing the freezing of the water in the drinking bowl of the fountain.

Other objects and advantages will be apparent from the following description when taken in connection with the accompanying drawing.

In the drawing:

Figure 1 is a vertical sectional view of the stock watering fountain and supply controlling means.

Figure 2 is a horizontal sectional view on the line 2—2 of Figure 1.

Referring particularly to the accompanying drawing, 10 represents a tank having its greater portion disposed within and below the surface of the ground 11, and into one side of which extends a water supply pipe 12, said pipe being located below the surface of the ground. The upper end of the tank is open, as shown, and formed around the inner portion of said open end is a shoulder 13, on which rests the lateral flange 14 of the drinking bowl 15. Connected to the bottom of the drinking bowl 15 is the cold water discharge pipe 16, which extends downwardly to within a short distance from the bottom of the tank, said pipe being formed from two concentrically arranged and spaced pipes, the ends of said pipes being sealed to provide a dead air space therebetween, as shown at 17. It will be noted that the lower end of the pipe 16 is disposed below the point of entrance of the supply pipe 12.

Formed centrally within the upper portion of the wall of the tank 10, is a chamber 18, and disposed within this chamber is a material 19, which is a poor conductor of heat, whereby to prevent passage of heat through the wall of the tank. The chamber 18, and the material 19 extend downwardly within the ground, to a point approximately that of what is known as the "frost line."

Sunken in the ground, but to a lesser depth than the tank 10, between said tank and the source of water supply, is a tank 20, the upper portion of which is similarly formed with a circumscribing chamber 21 filled with nonconducting material 22, said chamber and material 22 extending into the ground to the same depth as that of the chamber 18 and material 19. Extending upwardly through the bottom of the tank 20 are the pipes 23 and 24, the latter of which terminates a short distance from the upper end of the tank where it is provided with a float valve 25. To the lower end of the pipe 23 is connected the other end of the water supply pipe 12, of the tank 10. To the lower end of the pipe 24 there is connected a pipe 26 which leads to the source of water supply, which may be an elevated tank, a pressure tank, or city water pressure. A cover 27 is disposed on the upper end of the tank 20, as shown in the drawing.

The warmer water enters the tank 10 from the pipe 12 and rises in the tank to the upper portion thereof, passing through the openings 28 in the side of the bowl 15, below the flange 14, to fill the bowl. By this arrangement the water which passes into the bowl, through the openings 28, is cooled by exposure to the cold air, and as such water cools it descends through the pipe 16, to the bottom of the tank, with the result that the warmer water, entering the tank from the pipe 12, rises to take the place of the cooled water which has passed down through the pipe 16. The double wall of the pipe 16 prevents the heat from the ascending water from being transmitted to the colder water which descends through the said pipe. It is well known that the temperature below what is known as the "frost line", is a number of degrees higher than that above such line, with the result that the water at the bottom of the tank 10 is a much higher temperature than that at the upper end of the tank, and that in the bowl 15. The rising of the warmer water, and the descending of the cooled water, produces a constant circulation of water, within the tank 10, with the result that no portion of the water will remain exposed to the cold air for a period of time sufficient in which to freeze.

What is claimed is:

1. A stock watering device including a tank, means for delivering earth warmed water to the tank, a receptacle in the tank for receiving such earth warmed water, and means for returning the chilled water of the receptacle to the lower portion of the tank whereby to induce a circulation of water for the purpose of preventing freezing thereof 2. A stock watering device including a tank partly sunken in the ground and being open at its upper end, a drinking receptacle in the said open end of the tank, means for delivering earth warmed water into the tank, and an insulated conduit leading from the receptacle through the earth warmed water to a point adjacent the bottom of the tank whereby the entering water will not be chilled by the descending water.

3. A stock watering device including a tank having its greater portion beneath the level of the ground, means for delivering water to the tank below the frost line of the ground, a drinking bowl in the upper portion of the tank having means for receiving water delivered into the tank, and a conduit extending from the bowl to a point adjacent the bottom of the tank for delivering cooled water and being insulated from the warmer rising water.

4. A stock watering device including a tank partly sunken in the ground and having the lower part of its sunken portion below the frost line of the ground, means for delivering earth warmed water into the tank below the frost line, a receptacle in the upper portion of the tank receiving the ascending earth warmed water from below the frost line, a conduit connected with the receptacle and arranged to convey the air-cooled water to the lower portion of the tank below the frost line, said conduit passing through the ascending warmer water and being insulated therefrom.

In testimony whereof, I affix my signature.

ERNEST A. POWELL.